Figure 1:
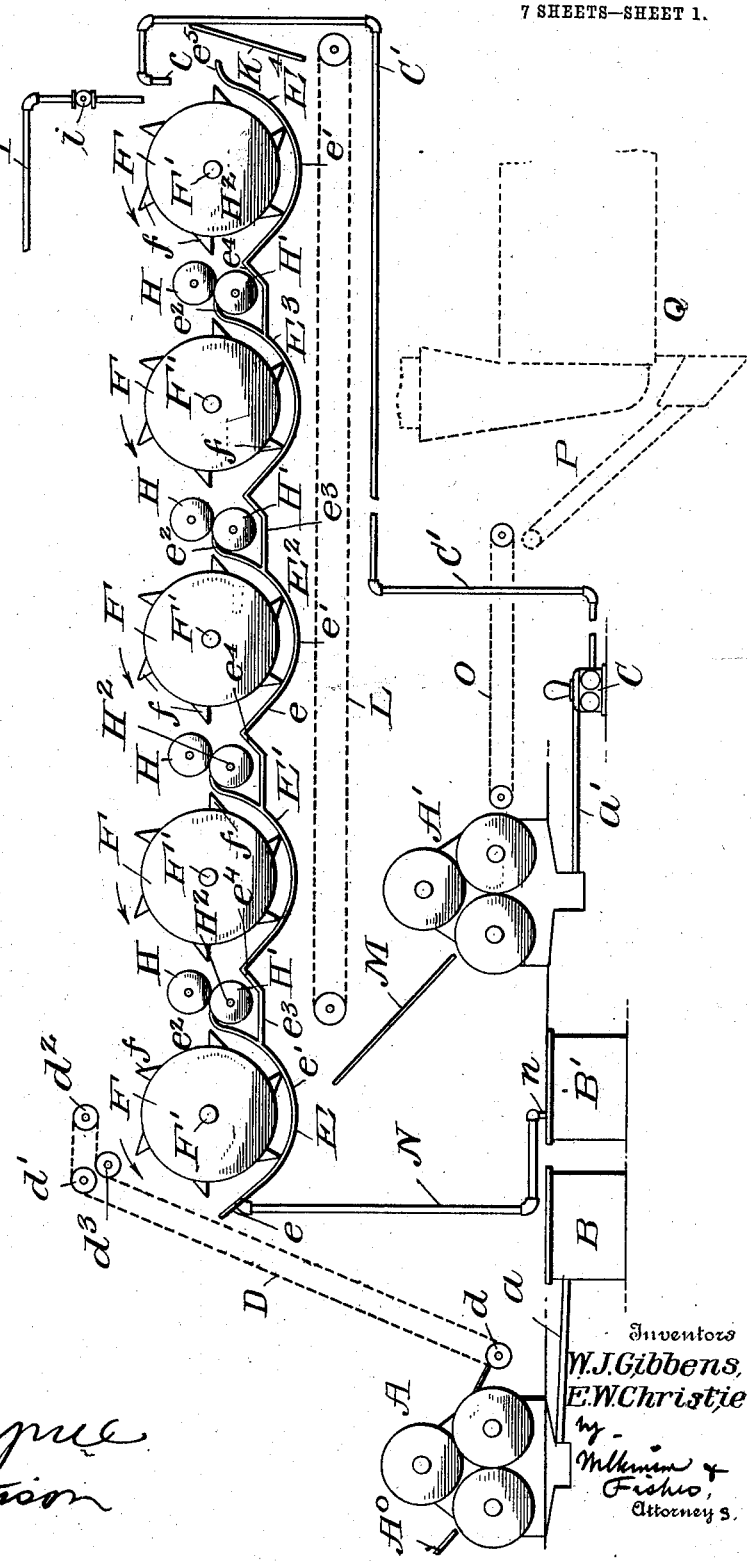

No. 757,295. PATENTED APR. 12, 1904.
W. J. GIBBENS & E. W. CHRISTIE.
PROCESS OF EXTRACTING SUCROSE.
APPLICATION FILED SEPT. 28, 1903.
NO MODEL. 7 SHEETS—SHEET 4.

Witnesses
Inventors
W. J. Gibbens,
E. W. Christie.
By Wilkinson & Fisher,
Attorneys.

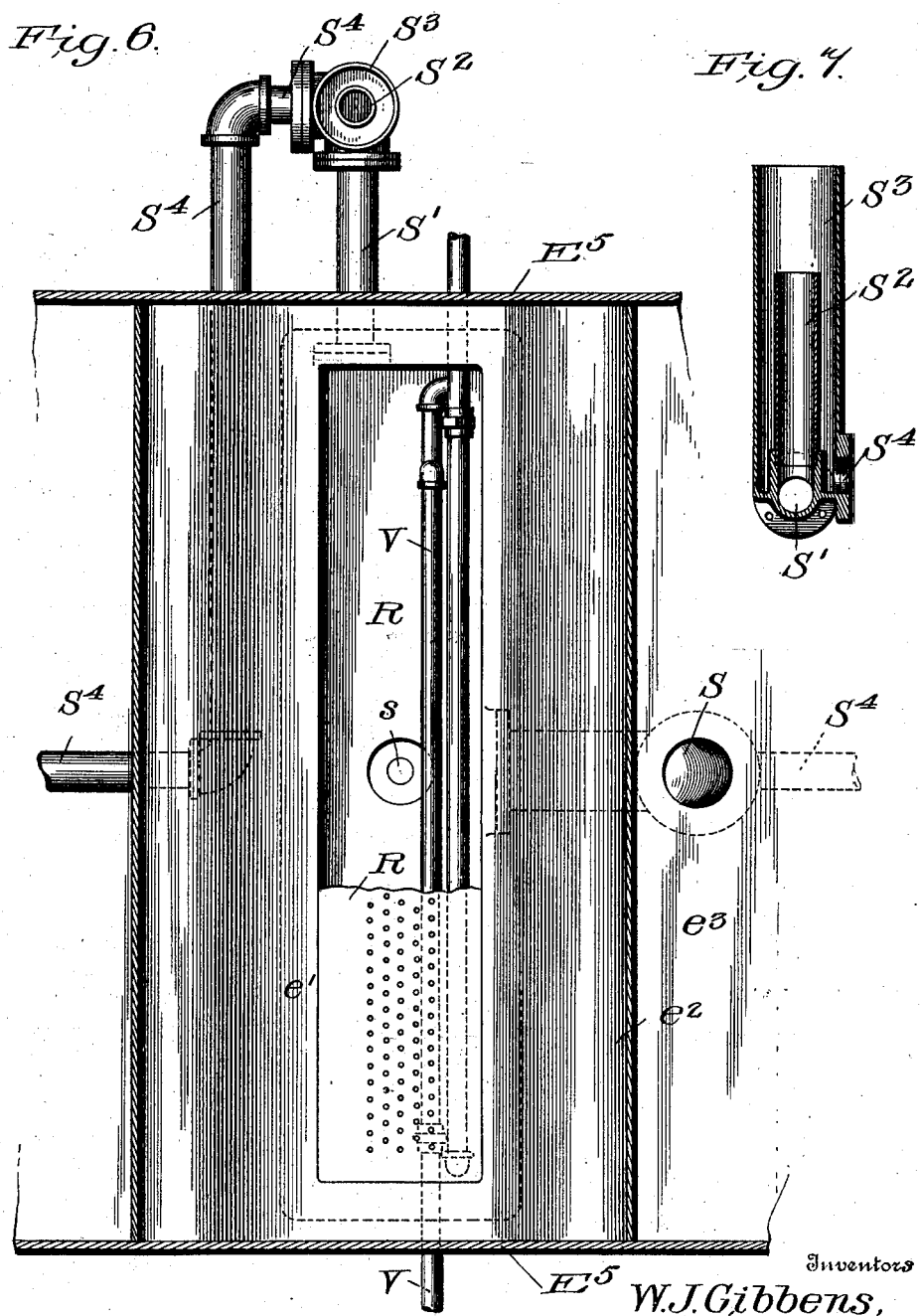

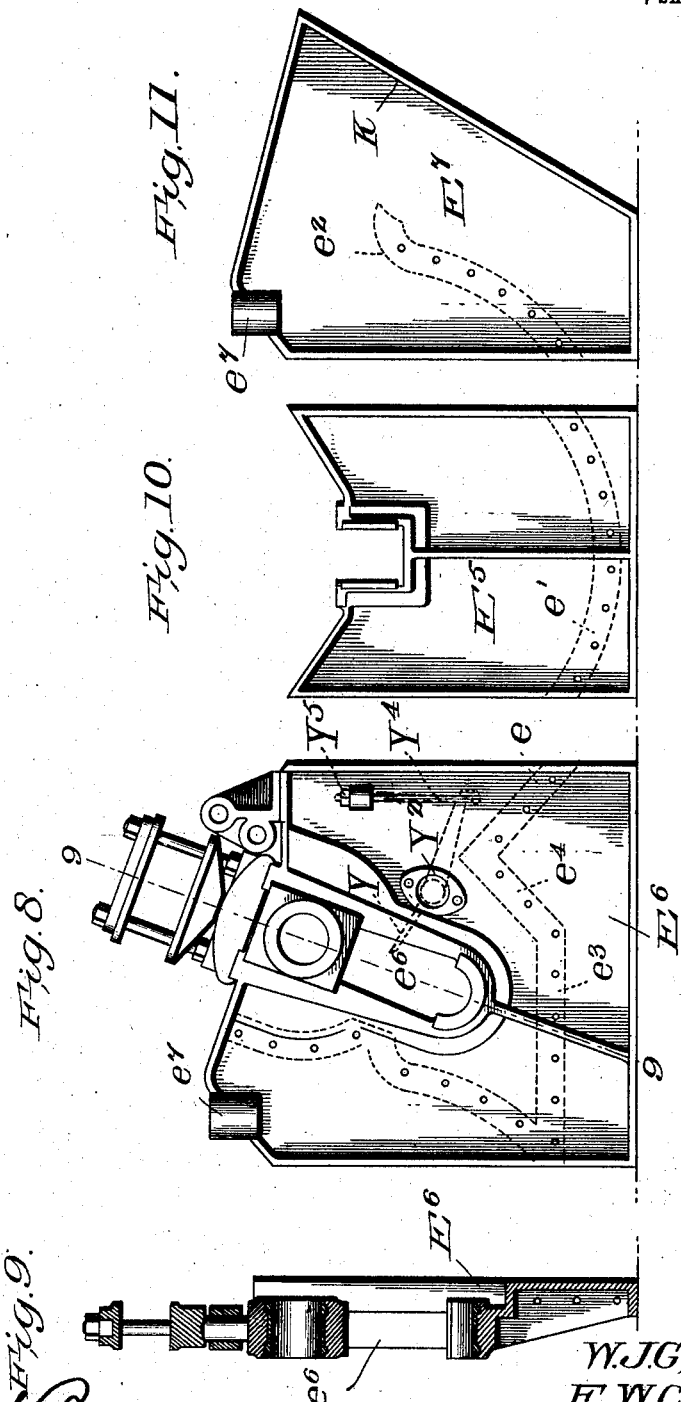

No. 757,295. PATENTED APR. 12, 1904.
W. J. GIBBENS & E. W. CHRISTIE.
PROCESS OF EXTRACTING SUCROSE.
APPLICATION FILED SEPT. 28, 1903.
NO MODEL. 7 SHEETS—SHEET 7.
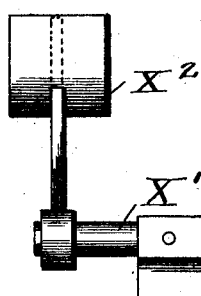
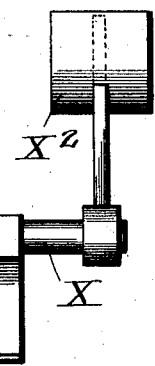
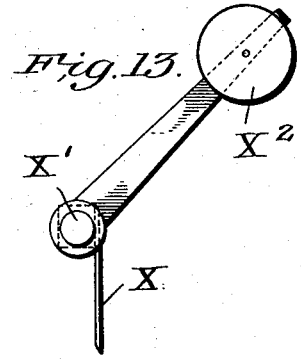
Fig. 12. Fig. 13.
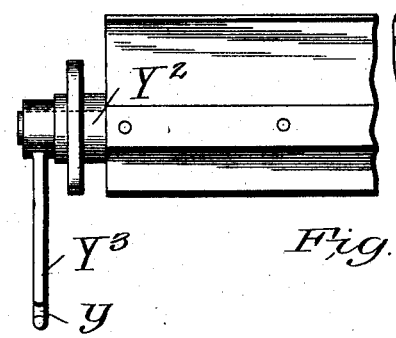
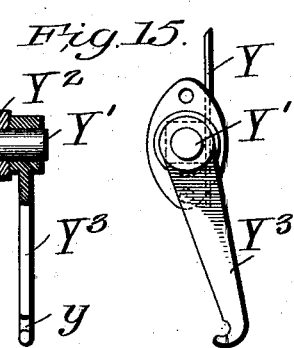
Fig. 14. Fig. 15.
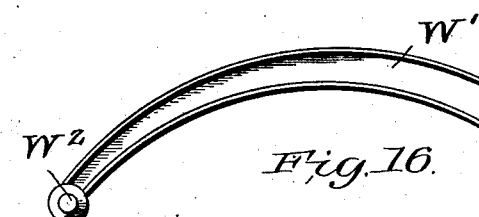
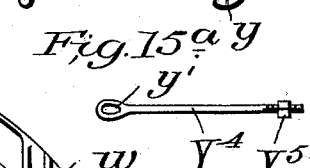
Fig. 16. Fig. 15a.
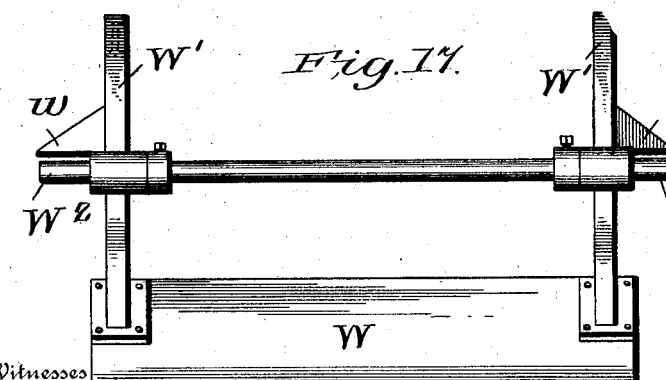
Fig. 17.
Witnesses
Inventors.
W. J. Gibbens,
E. W. Christie.
By Wilkinson & Fisher,
Attorneys.

No. 757,295. Patented April 12, 1904.

UNITED STATES PATENT OFFICE.

WILLIAM JOSEPH GIBBENS, OF NEW ORLEANS, LOUISIANA, AND EVI WILLSON CHRISTIE, OF VALLEY COTTAGE, NEW YORK, ASSIGNORS TO THE CHRISTIE ENGINEERING COMPANY, LIMITED, OF NEW ORLEANS, LOUISIANA, A CORPORATION OF LOUISIANA.

PROCESS OF EXTRACTING SUCROSE.

SPECIFICATION forming part of Letters Patent No. 757,295, dated April 12, 1904.

Application filed September 28, 1903. Serial No. 174,979. (No model.)

*To all whom it may concern:*

Be it known that we, WILLIAM JOSEPH GIBBENS, residing at New Orleans, parish of Orleans, in the State of Louisiana, and EVI WILLSON CHRISTIE, residing at Valley Cottage, county of Rockland, State of New York, citizens of the United States, have invented certain new and useful Improvements in Apparatus for Extracting Sucrose from Sugar-Cane; and we do hereby declare the following to be a full, clear, and exact description of the invention, such as will enable others skilled in the art to which it appertains to make and use the same.

Our invention relates to an improved process of extracting the sucrose from sugar-cane; and it consists in a certain novel method of combining the well-known method of extraction with the equally well-known method of diffusion whereby very little of the sucrose is left in the bagasse when the process is completed and the bagasse is made dry enough to burn readily in the bagasse-furnace.

In the ordinary process of manufacturing sugar from sugar-cane by grinding the cane-stalks are crushed through one, two, or three mills, generally through two or three, and leaves the last mill with so much of the moisture crushed out as to burn readily in specially-designed furnaces, and this bagasse furnishes a large proportion of the fuel required for running the factory. In the process of diffusion as ordinarily carried out the thoroughly-soaked "chips" or shavings of the cane are carried away without being dried by pressure, and this fuel is lost.

Our invention relates to combining these two processes in such a way as to effect the maximum extraction of the sucrose and at the same time to have the bagasse leave the apparatus dry enough to be used for fuel.

Our invention will be understood by reference to the accompanying drawings, in which the same parts are indicated by the same letters throughout the several views.

Figure 2:
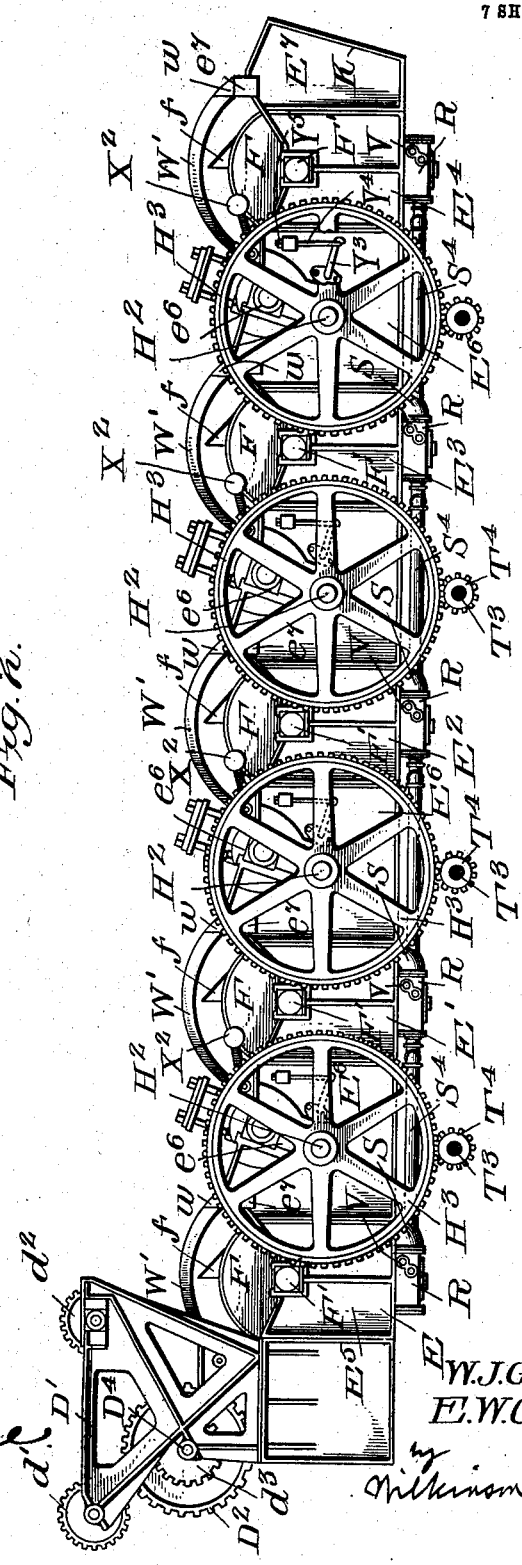
Figure 3:
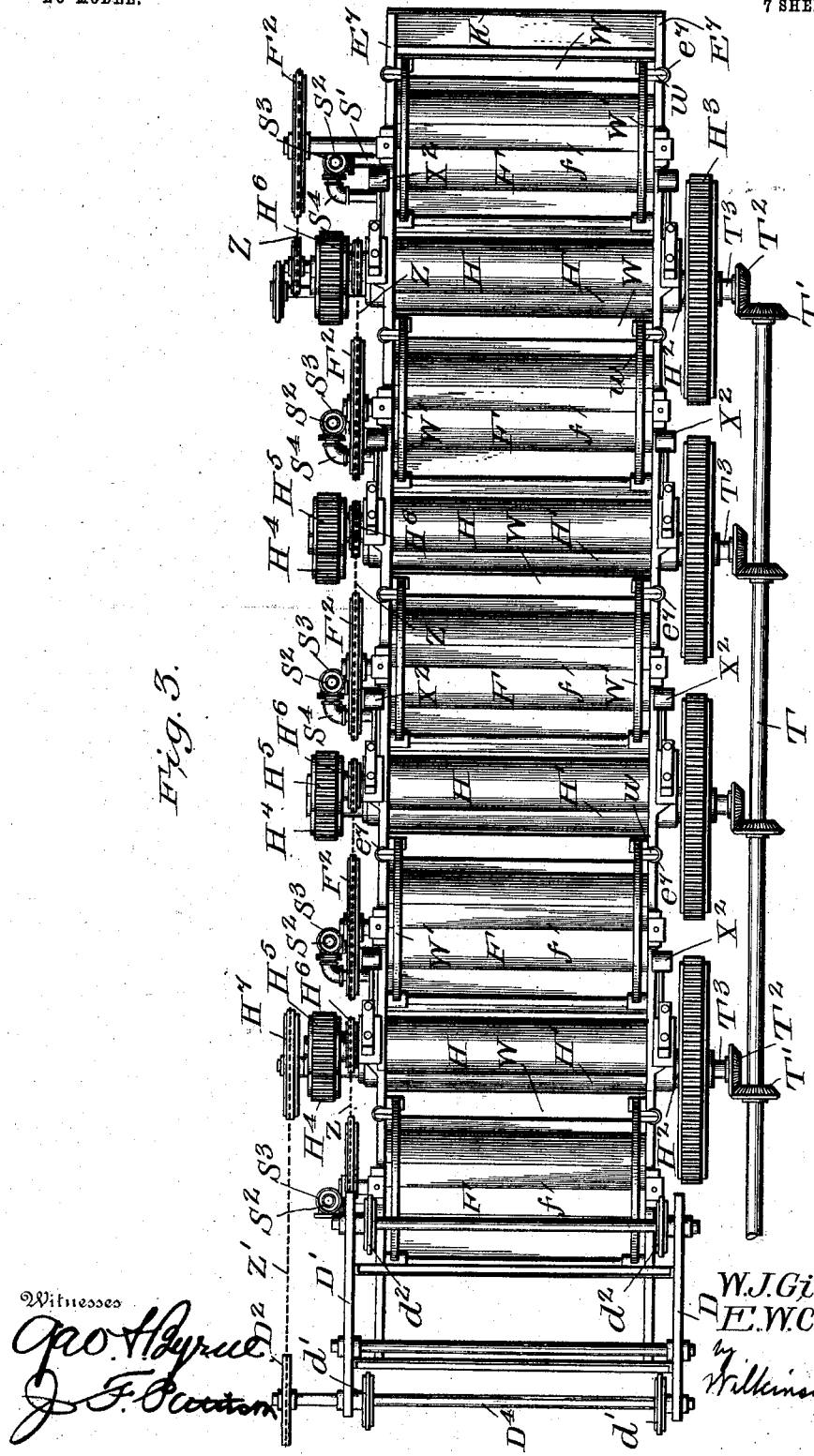
Figure 4:
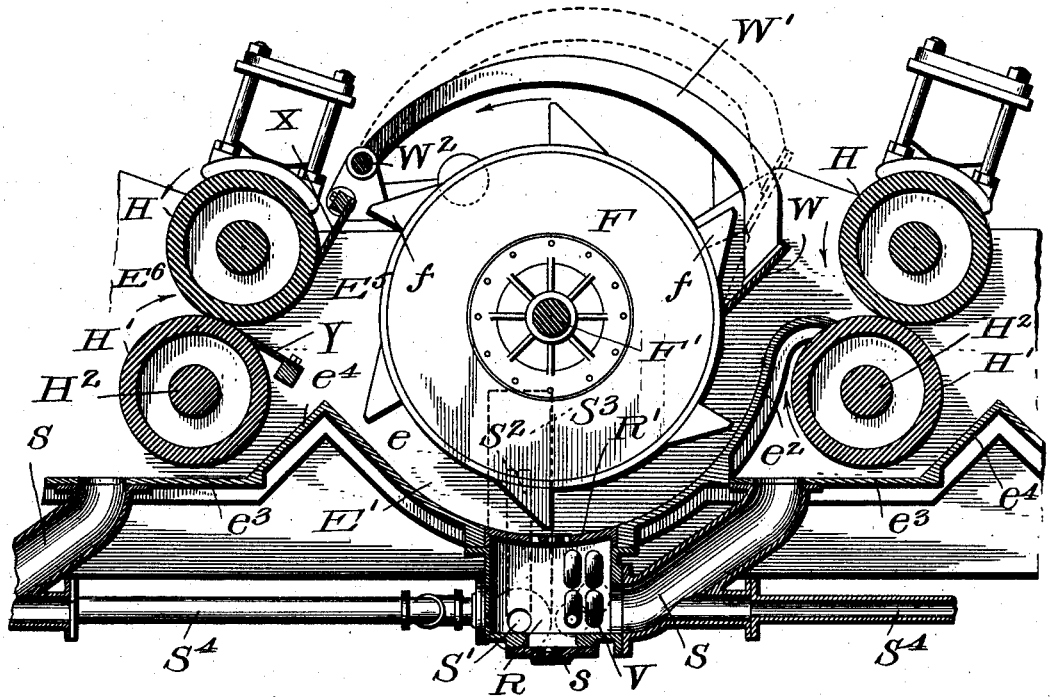
Figure 5:
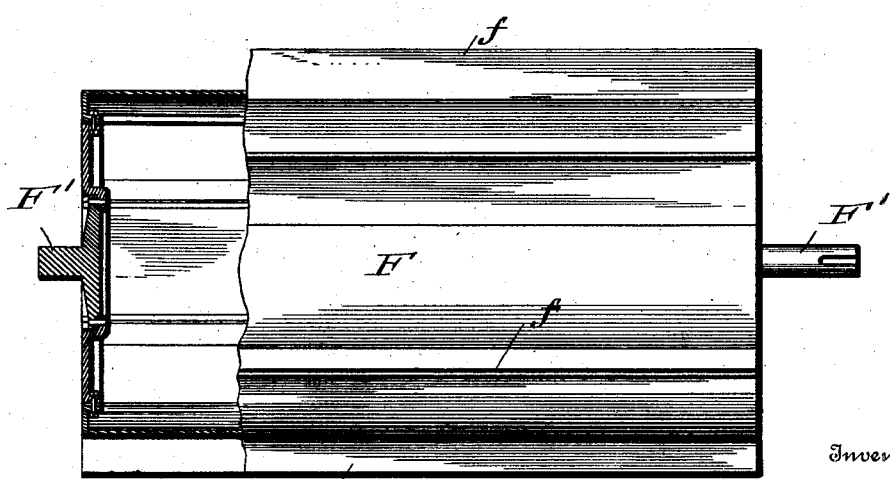

Figure 1 illustrates the apparatus diagrammatically, parts being omitted for the sake of clearness in the drawings. Fig. 2 is a side elevation of the series of diffusion-tanks and compression-rollers between the tanks, parts being broken away. Fig. 3 is a plan view of the device shown in Fig. 2. Fig. 4 is a central vertical section through one of the tanks and the adjacent parts, the parts being shown on a larger scale than in the before-mentioned figures. Fig. 5 is a plan view, partly broken away, of one of the rotary pushers for pushing the bagasse from tank to tank. Fig. 6 is a plan view of the bottom of one of the tanks, parts being broken away. Fig. 7 is a detail showing the overflow-pipe and its connections whereby the fluid is allowed to pass from one tank to the other. Fig. 8 is a detail showing one of the housing-plates in which the bearings for the small compressor-rollers are mounted. Fig. 9 is a section along the line 9 9 of Fig. 8. Fig. 10 is a detail showing one of the housing-plates in which the journal-bearings for one of the pushers are mounted. Fig. 11 shows one of the plates at the side of and near the end of the diffusion apparatus. The three plates shown in Figs. 8, 10, and 11 are bolted together when assembled. Fig. 12 is a plan view of one of the scrapers for one of the upper small compressor-rollers. Fig. 13 is a side elevation of the device shown in Fig. 12. Fig. 14 is a plan view showing one of the scrapers for the lower small compressor-rollers. Fig. 15 is an end view of the device shown in Fig. 14. Fig. 15$^a$ is a detail showing, on a smaller scale, the eyebolt attached to the lever-arm, as shown in Figs. 14 and 15. Fig. 16 is a side elevation of one of the scrapers for one of the pushers, and Fig. 17 is a plan view of the device shown in Fig. 16.

Referring now to Fig. 1, the cane is supplied by the cane-carrier (not shown) to the chute A° and thence to the mill A, and the juice expressed by said mill flows through the pipe or trough $a$ to the juice-tank B. The bagasse is carried by means of the carrier (indicated at D) to the combined diffusion and compressing apparatus, hereinafter to be described. In practice it would be preferable when possible to have this diffusion and compressing apparatus located directly between the crushing-mills A and A'; but to adapt the apparatus for use with mills already set up it can conveniently be located overhead, as indicated in Fig. 1. The bagasse from the carrier D is dumped into the tank E and is pushed forward by the pusher F to the first pair of compressor-rollers H and H', where the surplus moisture is squeezed out, and the bagasse is then delivered to the second tank E', whence it is pushed between the second pair of rollers, and thence it is delivered to the third tank $E^2$, and so on. It is finally pushed over the rear edge $e^5$ of the last tank $E^4$ and striking the chute K is deposited on the carrier L, whence it is delivered to the chute M, which delivers it to the mill A'. This mill presses the moisture out under high pressure and delivers the bagasse to the carrier O, by means of which it is delivered to the chute P, leading to the bagasse-burner Q. The liquid extracted by the mill A' is carried through the pipe $a'$ to the pump C and is delivered, by means of the pipe C', having the outlet $c$, to the last tank $E^4$. A limited amount of clear water is supplied by the pipe I, controlled by the valve $i$. The liquid squeezed out by the mill A', diluted with the water from the pipe I, flows backward through the diffusion apparatus in the reverse direction to that of the bagasse, growing richer and richer as it passes from tank to tank, and finally escapes by means of the overflow-pipe N and is delivered at $n$ to a suitable tank B'.

While we have shown two mills A and A', the device may be used with any number of mills, but should preferably be located between the last two mills of the series. We have shown five tanks with four sets of compression-rollers H and H'; but the number of tanks and of pairs of rollers may be varied at will.

The means for heating the fluid in the various tanks and for allowing the fluid to flow from tank to tank is omitted in Fig. 1 for the sake of clearness in the drawings.

It is preferable to heat the fluid not only because sucrose is more soluble in hot than in cold water, but also because the cells containing the sucrose are expanded and disrupted by heat.

Having thus described the general outlines of the invention, we will now proceed to describe the details of the apparatus as illustrated in the drawings.

The inclined bagasse-carrier D passes over suitable drums $d$, $d'$, $d^2$, and $d^3$, driven in any convenient way, as by means of the sprocket-wheel $D^2$ on the shaft $D^4$ and the chain Z'. (See Fig. 3.) The bagasse is dumped from this carrier on the top of the first pusher F, which is provided with pusher-teeth $f$, which project down into the tank containing the liquid. These teeth push the bagasse along down the incline $e$, over the curved bottom $e'$, and up over the tongue $e^2$, whence it is delivered to the first pair of rollers H and H'. The liquid expressed from these rollers falls on the incline $e^4$ and on the plate $e^3$ and passes down the pipe S into the bottom tank R. (Shown most clearly in Fig 4.) This bottom tank has a curved perforated top R' and contains heating-coils V. $s$ is a suitable drain, which may be closed by a plug or otherwise. This bottom tank R is connected by a pipe S' to the overflow-pipe $S^2$, which opens into a larger pipe $S^3$, connected by a pipe $S^4$ to the pipe S of the next tank, (see Figs. 4, 6, and 7,) and thus when the liquid in one tank reaches a predetermined level it overflows into the next, the liquid flowing from the last tank $E^4$ through the other tanks *seriatim* and finally escaping by the pipe N, as has already been described. The inflowing liquid is heated in the bottom tank R before rising in the tank above, and thus is hot when it comes in contact with the bagasse. The rollers H and H' are not intended to act at such great pressures as the rollers of the mill, but act like clothes-wringers to wring out most of the moisture, allowing the partly-dried bagasse to be soaked over and over again. The heavy pressure necessary to dry the bagasse suitable for fuel is supplied by the last mill A'.

For convenience in manufacture the parts of the apparatus are standardized, so as to be interchangeable, and the bottoms of the tanks are attached to standard housing-plates $E^5$, $E^6$, and $E^7$, (see Figs. 8 to 11,) which are bolted together.

In order to turn the rollers H and H' and the pushers F, any suitable gearing may be employed—such, for instance, as the shaft T, driven by any suitable source of power and carrying bevel-gears T', meshing with bevel-gears $T^2$ on the short shafts $T^3$, each of which short shafts carries a pinion $T^4$, meshing with the spur-gear $H^3$ on the shaft $H^2$, which shaft also carries the lower roller H'. (See Fig. 3.) The opposite end of the shaft $H^2$ carries a gear $H^4$, meshing with a similar gear $H^5$ on the shaft of the upper roller. Thus these two rollers are turned in toward each other, as indicated by the arrows in Fig. 4, and thus the bagasse is caught between the same and dragged through the rollers, being deposited in the next tank.

The pushers may be driven in any convenient way, such as by the sprocket-chains Z, engaging the sprocket-wheels $H^6$ on the shafts of the upper rollers H, which chains drive sprocket-wheels $F^2$ on the shafts F' of the pushers F.

The bagasse-carrier D may be driven in any suitable way, as by the sprocket-wheel $H^7$ and the sprocket-chain Z', engaging the sprocket-wheel $D^2$ on the shaft $D^4$, as already described.

In order to prevent the surfaces of the rollers and of the pushers from becoming clogged, suitable scrapers are required, such as are shown in detail in Figs. 12 to 17 and are also illustrated in Figs. 2, 3, and 4. Figs. 12 and 13 show the scraper for one of the upper rollers. This scraper consists of a resilient blade X, fastened on the shaft X', which shaft is provided with arms carrying weights $X^2$. These weights press the blade X against the face of the upper roller, as indicated in Fig. 4, and keep the same clean. The scraper for the lower roller is shown in Figs. 14, 15, and $15^a$, where Y represents a resilient blade fast on the shaft Y', which is mounted to rock in suitable journals $Y^2$, fast to the framework of the apparatus. This shaft Y' is rigidly attached thereto. The arms $Y^3$ are provided with hooks $y$, which engage in the eyes $y'$ of the eyebolts $y^4$, (see the right end of Fig. 2,) which eyebolts are adjusted, as by means of the nut $Y^5$, thus producing the requisite pressure of the blade Y on the face of the lower roller. The scrapers for the pushers F are shown in detail in Figs. 16 and 17. (See also Figs. 2, 3, and 4.) These scrapers consist of blades W, curved somewhat at their ends, as shown in Fig. 16, which blades are fast to curved arms W', which are connected to the rock-shaft $W^2$. As the pusher rotates in the direction of the arrow shown in Fig. 4 this blade W is pushed up, causing the scraper to take the position indicated in dotted lines in Fig. 4, when it passes over the edge of the pusher-tooth $f$ and returns to the position indicated in full lines in Fig. 4. To prevent the scraper W from dropping too far, stops $w$ are provided, which engage lugs or projections $e^7$ on the frame of the machine.

By the hereinbefore-described scrapers the surfaces of the rollers and of the pushers are kept clean.

It will be noted that in the herein-described apparatus the liquid pressed out by the last mill and containing a small amount of sucrose and diluted with water from the pipe I is carried successively through the various tanks, becoming richer and richer in sucrose until it finally escapes from the opposite end of the apparatus, while the bagasse is first subjected to the richer solution and then passes through a series of tanks each containing weaker solutions, being partly dried between each tank by the rollers H and H' until finally when nearly all of the sucrose has been diffused and squeezed out of it it is delivered to the last mill, where final compression is effected, and thence it is carried to the bagasse-furnace, where it is consumed as fuel.

In order to start the apparatus, the several tanks E to $E^4$ must first be filled with water, which is gradually carried off as the bagasse is pushed through, the deficit of liquid being supplied by the pipe I. The amount of water supplied by the pipe I during the normal operation of the apparatus would depend upon the saccharine density of the cane. Where the cane is very sweet, much more water would be added than where the cane is green or low in percentage of sucrose. The saccharine density at the outflow N may be varied at will by altering the supply of fresh water from the pipe I.

It will be obvious that various changes may be made in the herein-described apparatus and that in the process chemicals or other reagents may be added to promote or modify the effect.

Having thus described our invention, what we claim, and desire to secure by Letters Patent of the United States, is—

1. The herein-described method of extracting the sucrose from sugar-cane, which consists in grinding the cane in one or more mills, in subjecting the bagasse so ground to a series of immersions in a liquid adapted to dissolve out the sucrose, in squeezing part of said liquid out of the bagasse between each pair of immersions, and in finally subjecting the bagasse so treated to the heavy pressure of another mill, whereby most of the liquid contained therein is squeezed therefrom and the bagasse is left in a comparatively dry condition, substantially as described.

2. The herein-described method of extracting the sucrose from sugar-cane, which consists in grinding the cane in one or more mills, in subjecting the bagasse so ground to a series of immersions in a heated liquid adapted to dissolve out the sucrose, in squeezing part of said liquid out of the bagasse between each pair of immersions, and in finally subjecting the bagasse so treated to the heavy pressure of another mill, whereby most of the heated liquid contained therein is squeezed therefrom and the bagasse is left in a comparatively dry condition, substantially as described.

3. The herein-described method of extracting the sucrose from sugar-cane, which consists in grinding the cane in one or more mills, in subjecting the bagasse so ground to a series of immersions in a liquid adapted to dissolve out the sucrose, in squeezing part of said liquid out of the bagasse between each pair of immersions, in causing the liquid to flow through the system in an opposite direction to the motion of the bagasse, and in finally subjecting the bagasse so treated to the heavy pressure of another mill, whereby most of the liquid contained therein is squeezed therefrom and the bagasse is left in a comparatively dry condition, substantially as described.

4. The herein-described method of extracting the sucrose from sugar-cane, which consists in grinding the cane in one or more mills, in subjecting the bagasse so ground to a series of immersions in a heated liquid adapted so dissolve out the sucrose, in squeezing part of said liquid out of the bagasse between each pair of immersions, in causing the liquid to flow through the system in an opposite direction to the motion of the bagasse, and in finally subjecting the bagasse so treated to the heavy pressure of another mill, whereby most of the heated liquid contained therein is squeezed therefrom and the bagasse is left in a comparatively dry condition, substantially as described.

5. The herein-described method of extracting the sucrose from sugar-cane, which consists in grinding the cane in one or more mills, in subjecting the bagasse so ground to a series of immersions in a liquid adapted to dissolve out the sucrose, in squeezing part of said liquid out of the bagasse between each pair of immersions, and in finally subjecting the bagasse so treated to the heavy pressure of another mill, whereby most of the liquid contained therein is squeezed therefrom and the bagasse is left in a comparatively dry condition, and in injecting the liquid expressed by the last mill in the last immersion-chamber and causing said liquid to flow through the system in an opposite direction to the motion of the bagasse, whereby the weaker liquid encounters the bagasse containing less sucrose, and the strength of the sucrose solution increases as the quantity of sucrose to be extracted from the bagasse increases, substantially as described.

6. The herein-described method of extracting the sucrose from sugar-cane, which consists in grinding the cane in one or more mills, in subjecting the bagasse so ground to a series of immersions in a heated liquid adapted to dissolve out the sucrose, in squeezing part of said liquid out of the bagasse between each pair of immersions, and in finally subjecting the bagasse so treated to the heavy pressure of another mill, whereby most of the heated liquid contained therein is squeezed therefrom and the bagasse is left in a comparatively dry condition, and in injecting the liquid expressed by the last mill in the last immersion-chamber and causing said liquid to flow through the system in an opposite direction to the motion of the bagasse, whereby the weaker liquid encounters the bagasse containing less sucrose, and the strength of the sucrose solution increases as the quantity of sucrose to be extracted from the bagasse increases, substantially as described.

7. The herein-described method of extracting the sucrose from sugar-cane, which consists in subjecting the cane to heavy pressure thereby extracting a large percentage of the juice therefrom, in subjecting the bagasse remaining after said pressure to a series of immersions in a liquid adapted to dissolve out the sucrose, in squeezing part of said liquid out of the bagasse between each pair of immersions, and in finally subjecting the bagasse so treated to another and final heavy pressure, whereby most of the liquid contained therein is squeezed therefrom and the bagasse is left in a comparatively dry condition, in injecting the liquid expressed by the last heavy pressure in the last immersion-chamber and causing said liquid to flow through the system in an opposite direction to the motion of the bagasse, whereby the weaker liquid encounters the bagasse containing less sucrose, and the strength of the sucrose solution increases as the quantity of sucrose left in the bagasse increases, substantially as described.

8. The herein-described method of extracting the sucrose from sugar-cane, which consists in subjecting the cane to heavy pressure thereby extracting a large percentage of the juice therefrom in subjecting the bagasse remaining after said pressure to a series of immersions in a heated liquid adapted to dissolve out the sucrose, in squeezing part of said liquid out of the bagasse between each pair of immersions, and in finally subjecting the bagasse so treated to another and final heavy pressure whereby most of the liquid contained therein is squeezed therefrom and the bagasse is left in a comparatively dry condition, in injecting the liquid expressed by the last heavy pressure in the last immersion-chamber and causing said liquid to flow through the system in an opposite direction to the motion of the bagasse, whereby the weaker liquid encounters the bagasse containing less sucrose, and the strength of the sucrose solution increases as the quantity of sucrose left in the bagasse increases, substantially as described.

In testimony whereof we affix our signatures in presence of two witnesses.

WILLIAM JOSEPH GIBBENS.
EVI WILLSON CHRISTIE.

Witnesses:
  JOHN R. LOOMIS,
  EDMUND WEGENER.